(12) United States Patent
Vesepogu et al.

(10) Patent No.: US 10,198,340 B2
(45) Date of Patent: Feb. 5, 2019

(54) APPLICATION PERFORMANCE MONITORING

(71) Applicant: Appnomic Systems Private Limited, Bangalore (IN)

(72) Inventors: Nageswara Rao Vesepogu, Bangalore (IN); Sumanth Narasappa, Bangalore (IN); Padmanabhan Desikachari, Bangalore (IN)

(73) Assignee: Appnomic Systems Private Limited (IN)

( * ) Notice: Subject to any disclaimer, the term of this patent is extended or adjusted under 35 U.S.C. 154(b) by 0 days.

(21) Appl. No.: 14/599,351

(22) Filed: Jan. 16, 2015

(65) Prior Publication Data

US 2015/0199254 A1    Jul. 16, 2015

(30) Foreign Application Priority Data

Jan. 16, 2014    (IN) .............................. 186CHE2014

(51) Int. Cl.
*G06F 11/34* (2006.01)
*G06F 11/07* (2006.01)

(52) U.S. Cl.
CPC ...... *G06F 11/3419* (2013.01); *G06F 11/0709* (2013.01); *G06F 11/079* (2013.01);
(Continued)

(58) Field of Classification Search
CPC ............. G06F 11/3419; G06F 11/0709; G06F 11/079; G06F 11/3466; G06F 2201/865; G06F 2201/87
See application file for complete search history.

(56) References Cited

U.S. PATENT DOCUMENTS

| | | | |
|---|---|---|---|
| 2003/0110007 A1* | 6/2003 | McGee ............... | G06F 11/0709 702/179 |
| 2006/0020866 A1* | 1/2006 | Lo ....................... | G06F 11/0709 714/741 |

(Continued)

OTHER PUBLICATIONS

Magalhaes et al., "Adaptive Profiling for Root-cause Analysis of Performance Anomalies in Web-based Applications", 2011 10th IEEE International Symposium on Network Computing and Applications (NCA), Aug. 25-27, 2011, pp. 171-178.*

(Continued)

*Primary Examiner* — S. Sough
*Assistant Examiner* — Timothy P Duncan
(74) *Attorney, Agent, or Firm* — Van Pelt, Yi & James LLP (57) ABSTRACT

Various techniques associated with application performance monitoring are disclosed. In some embodiments, a subset of application methods is configured to capture response time metrics, and response time metrics for a prescribed application transaction are computed by summing corresponding response time metrics of methods of the subset that are executed during each transaction invocation. Method and transaction response time metrics are collected for each of a plurality of observation intervals, and the collected response time metrics are analyzed to identify anomalous method and transaction states. Co-occurring anomalous transaction and method states are correlated to identify a set of hotspot methods for the transaction, wherein hotspot methods comprise expected root causes for anomalies of the transaction.

21 Claims, 6 Drawing Sheets

(52) U.S. Cl.
CPC .... *G06F 11/3466* (2013.01); *G06F 2201/865* (2013.01); *G06F 2201/87* (2013.01)

(56) References Cited

U.S. PATENT DOCUMENTS

| | | | | |
|---|---|---|---|---|
| 2007/0169055 | A1* | 7/2007 | Greifeneder | G06F 11/3476 717/158 |
| 2008/0148039 | A1* | 6/2008 | Cobb | G06F 11/3612 713/100 |
| 2013/0263209 | A1* | 10/2013 | Panuganty | H04L 43/04 726/1 |

OTHER PUBLICATIONS

Magalhaes et al., "Detection of Performance Anomalies in Web-based Applications", 2010 9$^{th}$ IEEE International Symposium on Network Computer and Applications, pp. 60-67.*

* cited by examiner

| Observation | TransactionX | MethodA | MethodB | ... | MethodN |
|---|---|---|---|---|---|
| 1 | A | A | A | | A |
| 2 | A | A | N | | A |
| 3 | A | N | N | | A |
| 4 | N | N | A | | N |
| 5 | N | A | N | | N |
| ... | | | | | |
| n | N | N | N | | N |

APPLICATION PERFORMANCE MONITORING

CROSS REFERENCE TO OTHER APPLICATIONS

This application claims priority to India Provisional Patent Application No. 186/CHE/2014 entitled METHOD TO DETECT TRANSACTION HOTSPOTS IN JAVA APPLICATIONS filed Jan. 16, 2014, which is incorporated herein by reference for all purposes.

BACKGROUND OF THE INVENTION

Existing techniques for application performance monitoring comprise entire stack tracing, i.e., monitoring all invoked methods for performance issues. However, in a typical application comprising a large number of methods, monitoring application performance in such a brute force manner leads to system degradation to such an extent that the monitoring is not even possible in a production environment.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

An application comprises a plurality of associated methods that implement various functionalities associated with the application. Performance issues may sometimes arise in an application or parts thereof. In such cases, the application methods that are most likely responsible for the performance issues need to be identified to facilitate corrective actions. However, the task of identifying the points of failure in an application is typically complicated by the large number of methods that collectively comprise the application.

Various techniques for identifying a subset of methods comprising an application that are probable causes for observed application degradations and failures are disclosed. Such methods that are probable causes for degradations and failures are sometimes referred to herein as hotspot methods or simply hotspots. As further described, a subset of application methods is selected and instrumented to capture metrics that are used to detect anomalies. Correlations between anomalous transactions and associated methods are identified, i.e., hotspots are identified for prescribed application transactions. The disclosed techniques for hotspot detection impose very low overhead on a running application by not being very computationally intensive and still provide excellent accuracy.

As used herein, an application transaction refers to a unit of work or task performed by the application that corresponds to a prescribed domain or business functionality such as serving a client request. Examples of transactions in an e-commerce application include, for instance, purchasing, searching, reservation booking, report generation, etc. Each transaction generally involves the invocation of a plurality of application methods.

Figure 1:
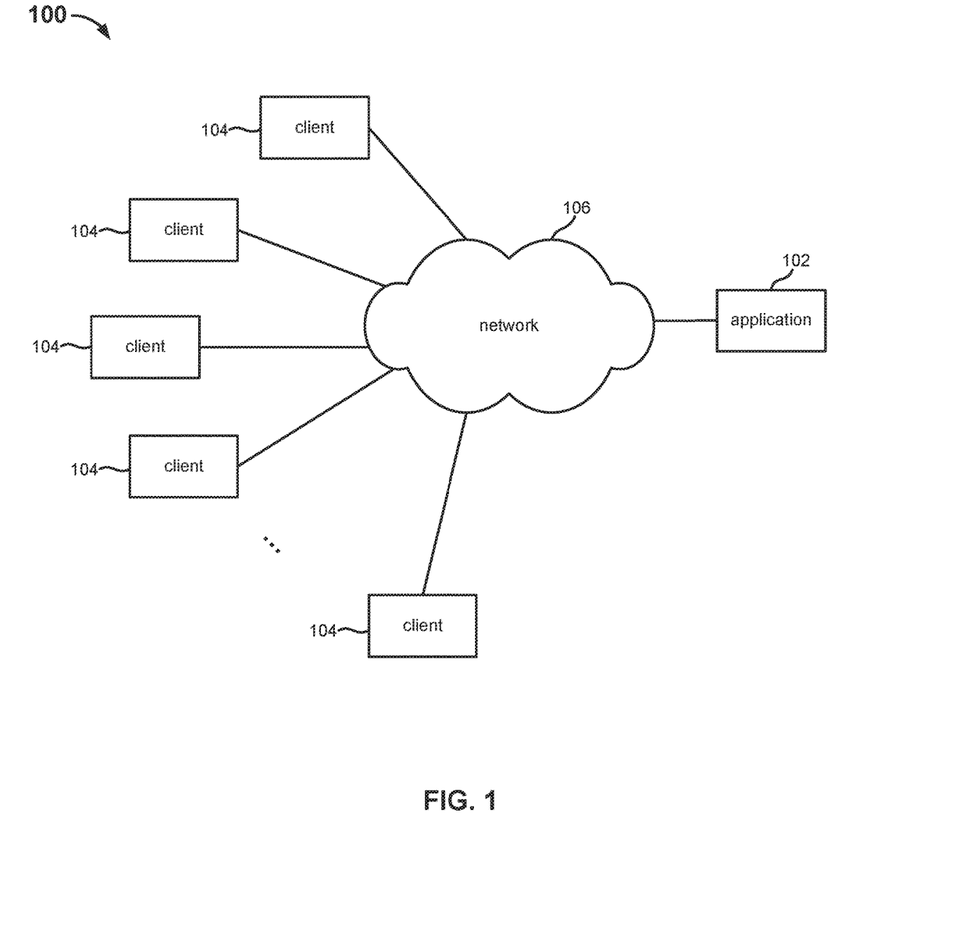
FIG. 1 is a high level block diagram illustrating an embodiment of a network environment in which an application is deployed.

FIG. 1 is a high level block diagram illustrating an embodiment of a network environment in which an application is deployed. In network environment 100, application 102 is accessible to one or more clients 104 via network 106, which may comprise any combination of one or more public and/or private, wired and/or wireless networks such as the Internet, a LAN, a WAN, a cellular network, etc. Application 102 comprises a software application, such as an enterprise application, e-commerce application, mobile application, etc. Application 102 is implemented by various hardware and software components. Hardware components comprising application 102 may include, for example, one or more web servers, application servers, database servers, etc. Software components comprising application 102 include modules associated with general functionalities such as database drivers, message queue clients, directory service clients, etc., as well as modules associated with facilitating specific application transactions. Application 102 may further comprise interactions with one or more external entities such as payment gateways, third-party web services, etc. In some embodiments, application 102 comprises a Java-based application, such as a multi-tiered J2EE application. In various embodiments, application 102 may comprise any number and combination of appropriately networked components that implement the functionality of the application, including external components.

Application methods may be instrumented to capture metrics employed to monitor and evaluate performance of the methods. The instrumentation of methods does produce some overhead on the running application. Thus, in most situations, it is impractical to instrument all application methods since doing so would generate very large data sets that would consume significant bandwidth and processing resources while introducing unacceptable latency. Given that some of the methods are invoked more frequently and/or are of more interest, in some embodiments, only a fraction of application methods are instrumented for collecting metrics. The subset of methods that are configured for monitoring may be determined heuristically, statistically, and/or with the aid of an application developer or domain expert. Metrics captured from monitored methods are employed to detect anomalous methods and/or transactions. Anomalous methods and transactions are correlated by identifying and refining frequently co-occurring item sets to determine the hotspot methods for a transaction. The disclosed statistical techniques for identifying and monitoring the most frequently faulting methods without doing a deep dive or tracing by brute force introduces little overhead on an application since only a subset of methods are monitored. As a result, such techniques may be employed to facilitate runtime application performance monitoring in a production environment.

Figure 2A:
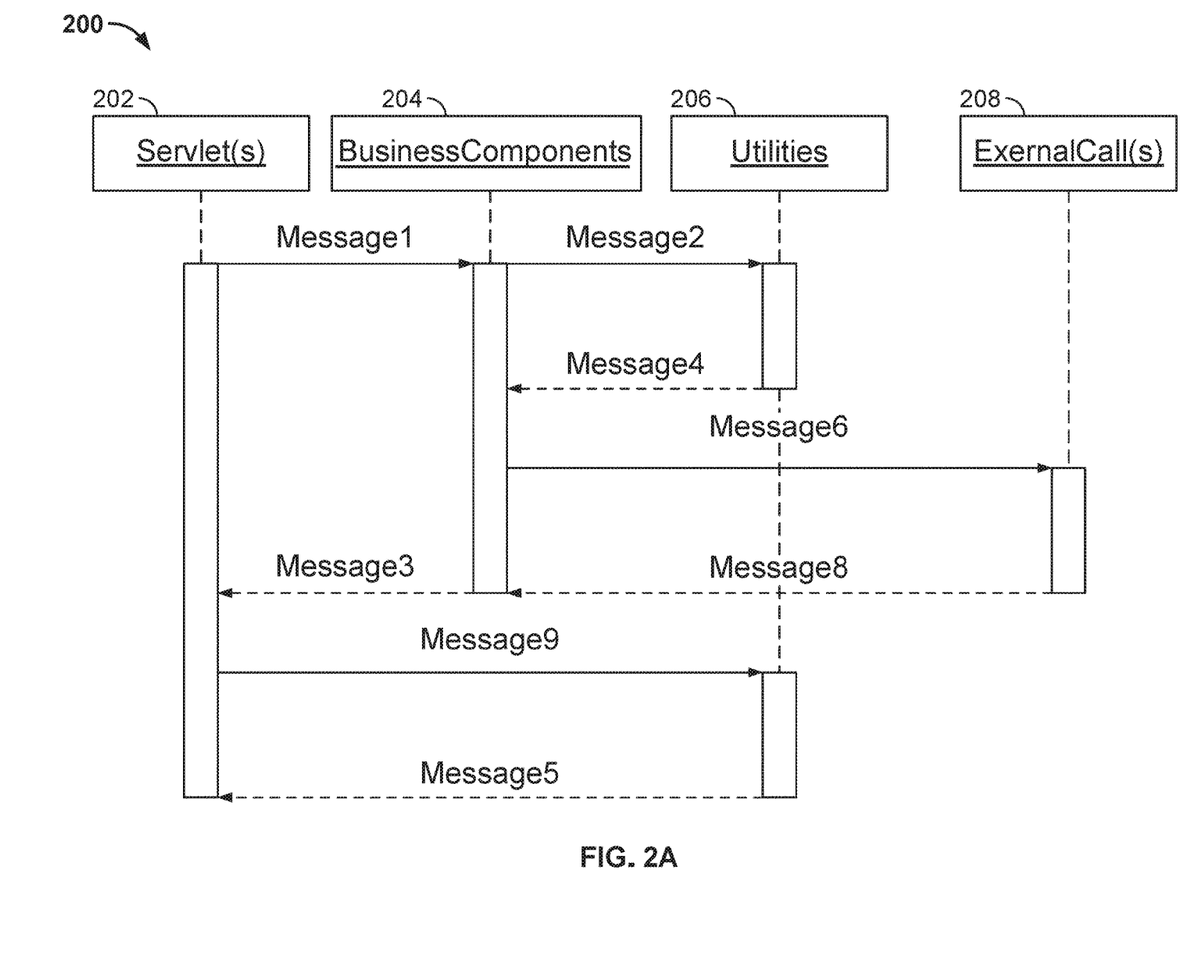
FIGS. 2A-2B illustrate examples of call graphs of a typical application.
Figure 2B:
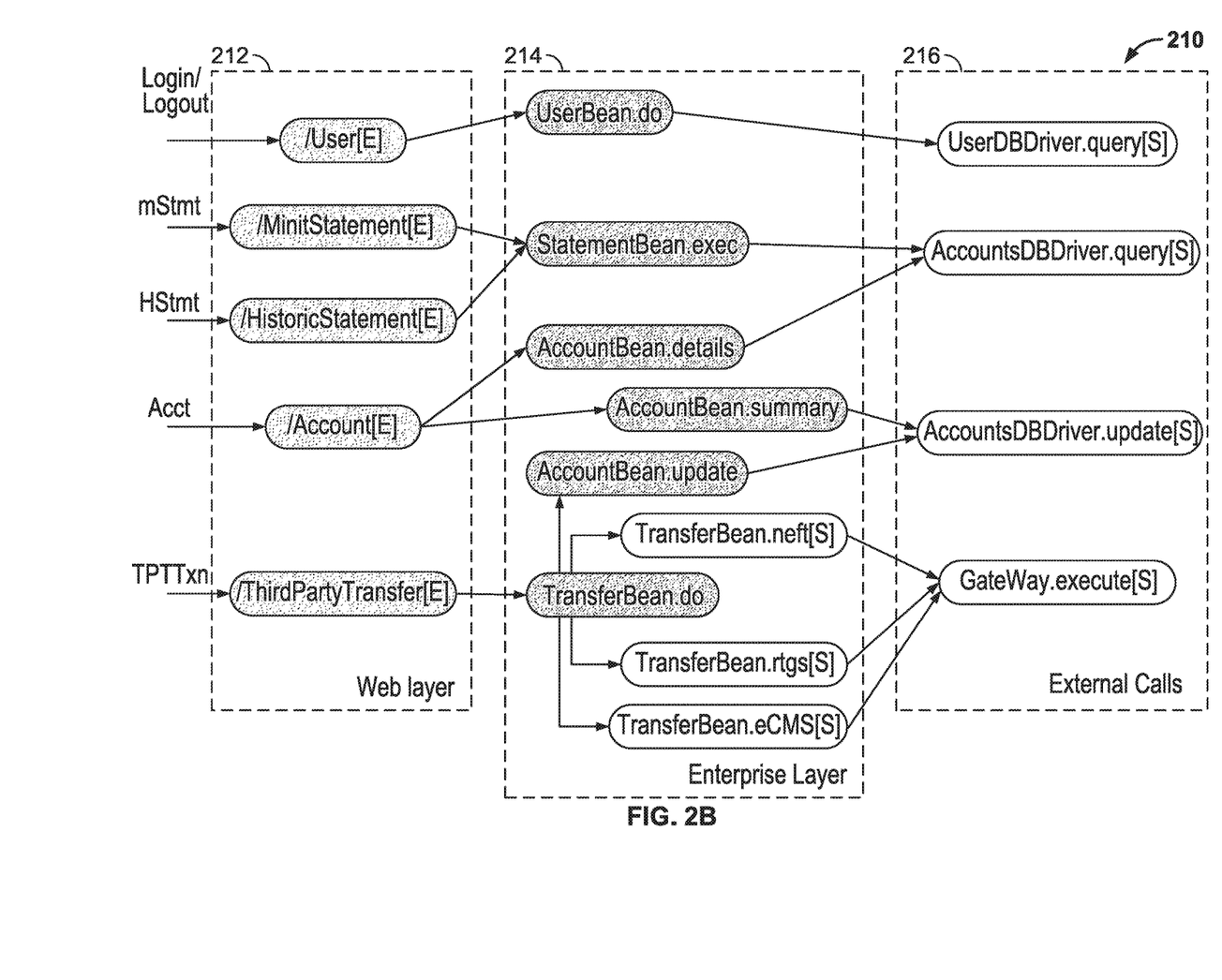

FIGS. 2A-2B illustrate examples of call graphs of a typical application, such as a Java-based application. FIG. 2A is a high level call graph 200 that includes calls to one or more servlets 202, business components 204 (e.g., enterprise beans), general utility classes 206, and external components 208 (e.g., external database calls). In a modular architecture, each request identified by a unique URL (Uniform Resource Locator) is mapped to a servlet or an action in a Model View Controller (MVC) framework. Thus, in the context of intrusive monitoring, certain servlet methods may be taken as possible entry points of the application. Utilities and modules for executing calls to external components such as databases are shared among different business components. An application transaction involves invocation of a plurality of methods across various layers of the application. FIG. 2B illustrates an example of a call graph 210 of a transaction. That is, transaction methods and their flow across application layers 212-216 are depicted in call graph 210. In this example, transaction triggers or entry point methods are marked [E], methods marked [S] may be significant since these methods have direct impact on transaction response time, and the remaining methods may not be that significant as they simply execute logic after receiving values from external calls.

Figure 3:
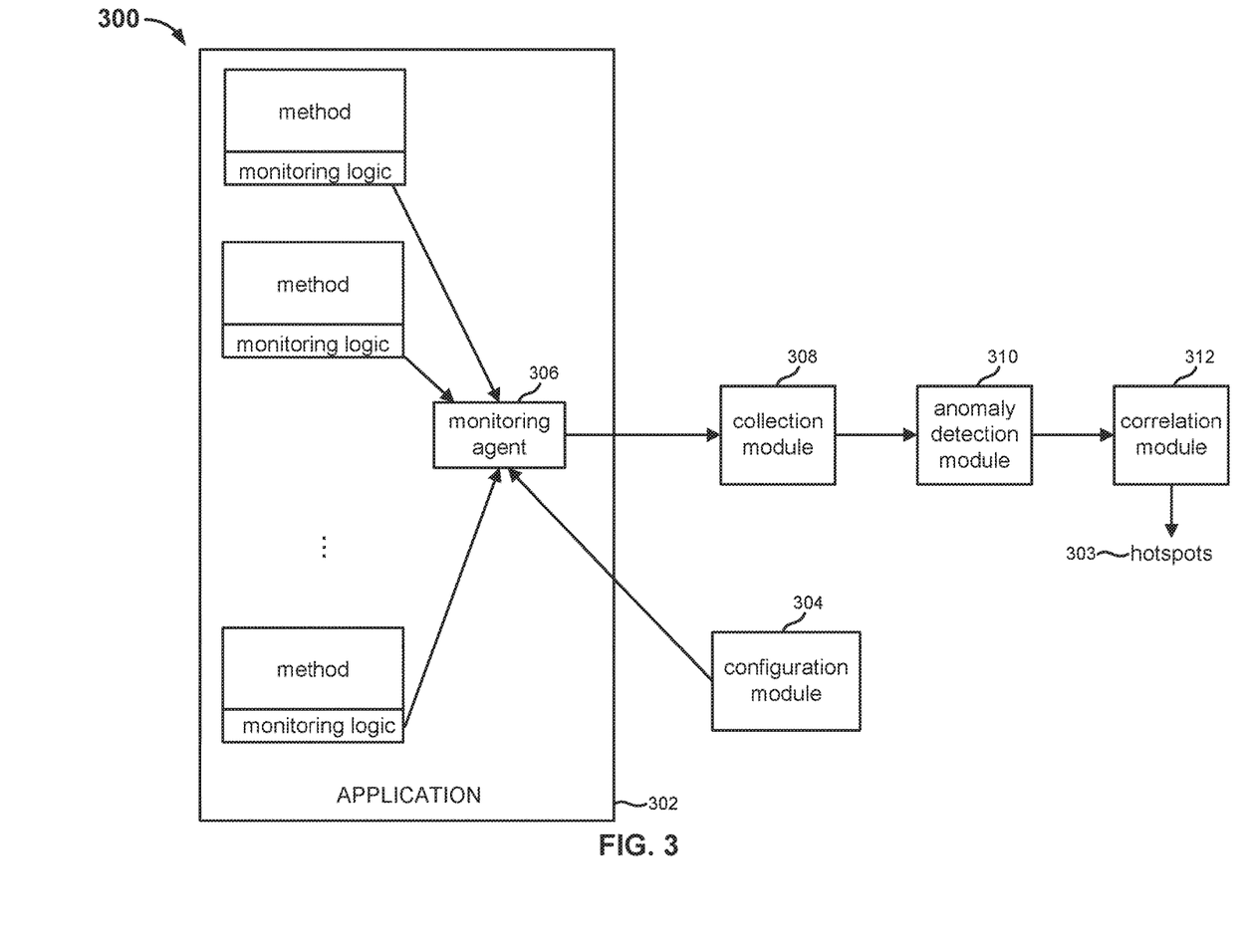
FIG. 3 is a high level block diagram illustrating an embodiment of components comprising a system for application performance monitoring.

FIG. 3 is a high level block diagram illustrating an embodiment of components comprising a system for application performance monitoring. System 300 includes various components that collectively monitor the performance of application 302 and determine hotspots 303 for application transactions. Specifically, system 300 includes a configuration module 304, monitoring agent 306, collection module 308, anomaly detection module 310, and correlation module 312. Each of these modules is further described in detail below.

Configuration module 304 facilitates the deployment and configuration of monitoring agent 306 with respect to application 302 as well as a specification of application methods to monitor. A subset of application methods or method types most likely to impact application performance is intelligently selected for monitoring. Identifying this subset of application methods is especially important in a large scale application comprising many methods. In some embodiments, the subset of application methods is at least in part selected heuristically, for example, on a per application basis. Moreover, the subset of application methods may be programmatically selected via an automated process of monitoring agent 306 and/or manually specified, for example, by an administrator of system 300 and/or a developer of application 302. In some cases, the subset of methods is shortlisted from a master list of application classes and/or methods, which may, for example, be obtained from application documentation and/or captured from running monitoring agent 306 in a configuration mode, e.g., in a UAT (User Acceptance Testing) environment. In some embodiments, an initial target list of methods for monitoring includes all or a subset of important entry points (e.g., servlets), business components, utilities, external components (e.g., driver classes), and/or exit points. The aforementioned types of methods may be identified, for instance, from associated package names and/or extensions. In some embodiments, an initial target list is automatically and/or manually refined to determine a final subset of methods to monitor. For example, some methods that are known not to create performance issues may be removed from the list while other methods that are desired to be monitored may be added. The list of methods to monitor may be updated, for example, as the application evolves over time.

Monitoring agent 306 facilitates instrumenting each of the subset of application methods selected for monitoring, e.g., with monitoring logic. That is, monitoring agent 306 injects code into each method that is configured to capture and report one or more metrics and/or statistics associated with that method. On method invocation, the instrumented monitoring logic captures metrics specific to that method and pushes captured values to monitoring agent 306. Monitoring agent 306 further facilitates capturing metrics on application transactions. In some cases, metrics associated with a given application transaction may be inferred or computed using the corresponding metrics of monitored methods comprising the transaction. For example, transaction response time (i.e., the amount of time taken to complete the transaction) may be determined by summing the response times of monitored methods comprising the transaction.

In various embodiments, any one or more appropriate method/transaction metrics or KPIs (Key Performance Indicators) may be detected and/or determined. Examples include the number of invocations over a prescribed observation (e.g., time) window, response time per invocation and/or average response time over a prescribed number of invocations or observation window, success state per invocation and/or average success/failure rate over a prescribed number of invocations or observation window, etc. In some embodiments, different metrics may be captured for different application methods/transactions. Method metrics represent system state and behavior while transaction metrics represent the load induced on the system.

Monitoring agent 306 collects metrics and transfers data sets to collection module 308, e.g., at prescribed intervals such as at every one minute interval. Collection module 308 aggregates metrics reported from monitoring agent 306. In some embodiments, received metrics may optionally be further processed at collection module 308, e.g., to generate further metrics. The method/transaction metrics received and/or computed by collection module 308 are stored, e.g., in an associated database.

Anomaly detection module 310 analyzes the metrics data collected by collection module 308 to identify anomalous behavior. More specifically, anomalies in method and transaction response times are identified. In various embodiments, any observation interval or time window over which to detect anomalies may be selected, such as one minute. Response time data is statistically analyzed to identify outliers indicating anomalous behavior, i.e., degradations and failures. Any combination of one or more anomaly/outlier detection algorithms may be employed on transaction/method response time data in each observation interval (i.e., time window) under consideration to identify states (anomalous or normal) of the transaction/methods for a given observation interval (time window). Examples include the median rule, modified z-scores, Grubbs' test, chi-square, density based methods, etc.

In an algorithm based on the median rule, for example, a particular observation interval (time window) for a transaction/method is marked as anomalous if there exists more than a prescribed percentage (e.g., 5%) of response time instances that are greater than a defined upper fence. The upper fence or threshold for data points may be defined in any appropriate manner, such as using the following example definition: upper fence=measure of 2nd quartile+ 2.3*interquartile range. In many cases, a system may continue in an anomalous state for a prescribed time period with response times continuously remaining very fast. Such cases may be detected using more robust anomaly detection techniques that can detect median shift. For example, by taking modified z-scores of a prescribed number of previous points, the median shift in subsequent points may be calculated. In such cases, data points having z-scores greater than a prescribed threshold are marked anomalous. Modified z-scores may be computed in any appropriate manner, such as using the following example definition: modified z-scores=0.6745*(median of response time in current window−median of median response times)/median absolute deviation response times.

Figure 4:
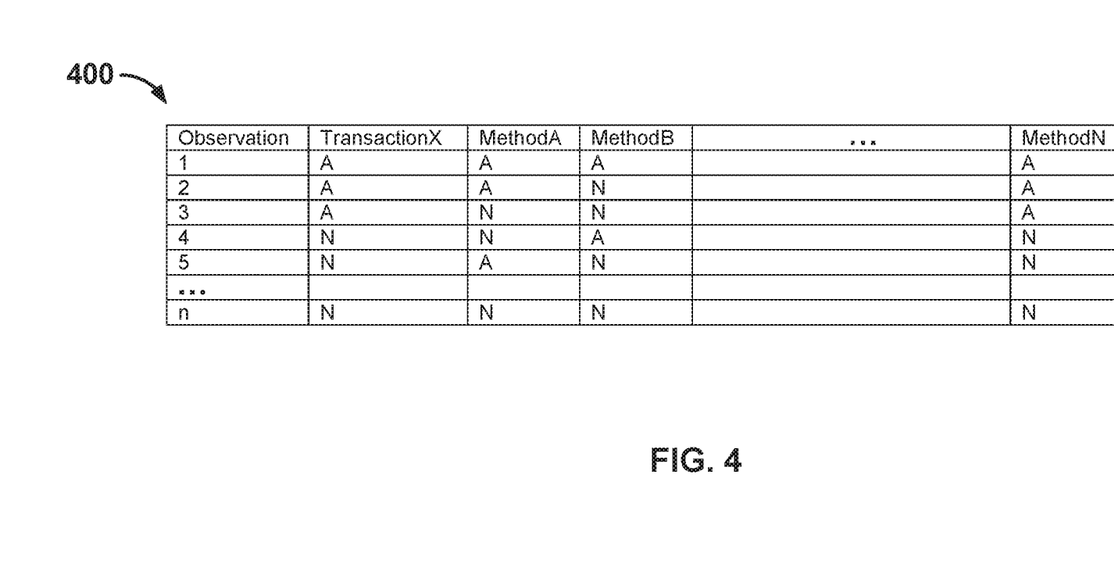
FIG. 4 is a data structure illustrating an embodiment of a state matrix.

A matrix is generated that specifies the state (e.g., anomalous or normal) of a particular transaction as well as associated methods across observation intervals (time windows). A separate state matrix is created for each transaction set under monitoring. Such state matrices are output by anomaly detection module 310. FIG. 4 is a data structure illustrating an embodiment of such a state matrix 400 in which "A" represents an anomalous state and "N" represents a normal state.

Correlation module 312 identifies the methods associated with a transaction that are likely root causes for transaction anomalies, i.e., the hotspot methods of the transaction. As previously stated, the response time of a transaction is the sum of response times of all the methods that get executed for the transaction. Theoretically, if a transaction is detected as anomalous, then the root cause is the result of deviations of one or more of these methods. The process of finding a set of root-cause methods is in some embodiments done in two stages. First, a frequent set of anomalous methods is determined that co-occur when a prescribed transaction is detected as anomalous. Later, the set of methods is fine-tuned using dissociation rules to identify and eliminate possible non-participating methods.

Any appropriate algorithm for mining frequent item sets may be employed, such as the Apriori algorithm. For example, applying the Apriori algorithm on a state matrix output by anomaly detection module 310 generates a list of anomalous methods that co-occur (e.g., in a prescribed time window) when the corresponding transaction is detected as anomalous. That is, a combination of a transaction and a set of methods that frequently co-occur as anomalous are identified. Better correlations can be learned from a data set spanning several observations. The learned method set may be used as a blue-print for root cause analysis and may be further refined through association analysis and/or regression. In some embodiments, a correlation model is used that is based on thresholds defined for one or more statistical parameters such as support (the support of a rule indicates how frequently the items in the rule occur together) and confidence (the confidence of a rule is the conditional probability that the consequent will occur given the occurrence of the antecedent). Such a model is employed to infer the significance of anomalous methods that correlate with a transaction anomaly to arrive at a more refined set of possible root cause methods or hotspots for the transaction.

It is possible that some methods (that are not related) keep failing in an application. These methods may be included in a set of hotspot methods because of frequent occurrence instead of actual correlation. In order to further refine a hotspot set to obtain a more accurate set of methods, a measure of occurrence and/or non-occurrence may be employed. Any appropriate measure may be employed, such as the ratio of count(transaction is normal)+count(method is normal)/total transaction. This particular ratio is high for a transaction and methods that co-occur but will be less for a method which fails more frequently and is not related. Using such a measure as a weight and multiplying with minimum support and/or confidence values from the previous stage results in a score being associated with each method. In such cases, a threshold may be specified to refine the hotspot set, e.g., a prescribed number of top scoring methods from the set may be selected as hotspots, with lower scoring methods eliminated from the hotspots set.

Some methods and transaction failures are very rare and do not occur often. In the cases in which high support is set in the previous stage, such hotspots are mostly not discovered. Logistic regression algorithms may be used to detect hotspots for transactions which do not fail often. For example, the Firth method may be employed. Once a regression model is built, among all the predictor variables (methods), the most significant methods are chosen based on attribute selection methods.

Figure 5:
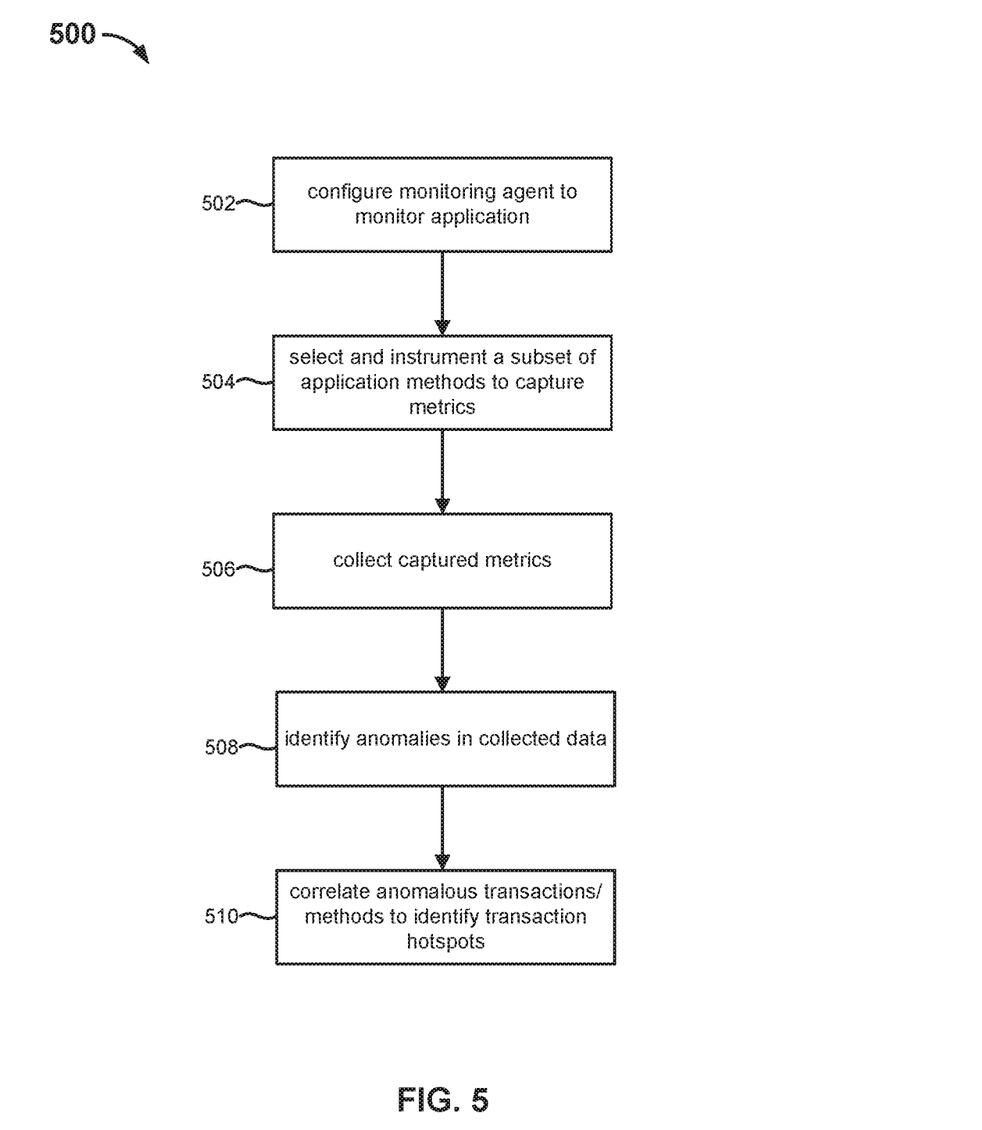
FIG. 5 is a flow chart illustrating an embodiment of a process for identifying transaction hotspots.

FIG. 5 is a flow chart illustrating an embodiment of a process for identifying transaction hotspots. In some embodiments, the various steps of process 500 are performed by applicable components of system 300 of FIG. 3. At step 502, a monitoring agent is configured to monitor the performance of an application. At step 504, a subset of application methods are selected and instrumented to capture metrics. At step 506, captured metrics are collected and/or stored. At step 508, anomalies are identified in the collected data. At step 510, transaction hotspots are identified by correlating anomalous transactions and methods.

The disclosed statistical approach for determining the most frequently faulting methods without performing a deep dive or tracing by brute-force is useful for many applications, including Java-based applications. Finding hotspots is desirable for an associated development/maintenance team since it provides an opportunity to tune or re-factor these methods for better performance. Similar to transactions and methods being clustered based on degraded symptoms, a method cluster may be formed that gives the most frequently degraded method sets. This enables method level dependencies and problem areas in an application to be discovered without full-fledged profiling. A key advantage is determining degraded methods for a given transaction. This aids an operator in localizing performance issues to a method or an external service without having to perform a deep dive. It also provides a score for frequently occurring patterns with respect to methods and transactions, which enables localization of problems. Monitoring overhead is reduced by monitoring only the most significant methods.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   instrumenting only a subset of application methods for capturing response time metrics, wherein the subset of application methods is statistically expected to impact application performance and wherein the subset of application methods includes methods comprising external component calls to third party services;
   during application runtime capturing response time metrics for each invocation of each of the subset of application methods;
   computing response time metrics for application transactions by summing corresponding response time metrics of methods of the subset that are executed during each transaction invocation;
   analyzing response time metrics to identify anomalous method and transaction states;
   correlating co-occurring anomalous transaction and method states to identify a set of hotspot methods for each transaction, wherein hotspot methods comprise expected root causes for anomalies of each transaction;
   refining the identified set of hotspot methods for each transaction using dissociation rules to eliminate non-participating methods that frequently fail but are not correlated to anomalous transaction states; and
   facilitating corrective action in response to determining hotspot methods for each transaction.

2. The method of claim 1, wherein the subset does not include all methods executed during each transaction invocation.

3. The method of claim 1, wherein analyzing includes detecting median shifts in response time metrics.

4. The method of claim 1, wherein method and transaction response time metrics are collected for each of a plurality of observation intervals.

5. The method of claim 1, wherein analyzing response time metrics to identify anomalous method and transaction states comprises generating a state matrix for each transaction and associated methods.

6. The method of claim 1, wherein refining is based on a ratio and a threshold.

7. The method of claim 1, wherein refining further includes refining the set of hotspot methods to add correlated rarely failing methods.

8. A system, comprising:
   a processor configured to:
      instrument only a subset of application methods for capturing response time metrics, wherein the subset of application methods is statistically expected to impact application performance and wherein the subset of application methods includes methods comprising external component calls to third party services;
      receive during application runtime response time metrics for each invocation of each of the subset of application methods;
      compute response time metrics for application transactions by summing corresponding response time metrics of methods of the subset that are executed during each transaction invocation;
      analyze response time metrics to identify anomalous method and transaction states;
      correlate co-occurring anomalous transaction and method states to identify a set of hotspot methods for each transaction, wherein hotspot methods comprise expected root causes for anomalies of each transaction;
      refine the identified set of hotspot methods for each transaction using dissociation rules to eliminate non-participating methods that frequently fail but are not correlated to anomalous transaction states; and
      facilitate corrective action in response to determining hotspot methods for each transaction; and
   a memory coupled to the processor and configured to provide instructions to the processor.

9. The system of claim 8, wherein the subset does not include all methods executed during each transaction invocation.

10. The system of claim 8, wherein to analyze includes to detect median shifts in response time metrics.

11. The system of claim 8, wherein method and transaction response time metrics are collected for each of a plurality of observation intervals.

12. The system of claim 8, wherein to analyze response time metrics to identify anomalous method and transaction states comprises generating a state matrix for each transaction and associated methods.

13. The system of claim 8, wherein to refine is based on a ratio and a threshold.

14. The system of claim 8, wherein to refine includes to further refine the set of hotspot methods to add correlated rarely failing methods.

15. A computer program product embodied in a non-transitory computer readable storage medium and comprising computer instructions for:
   instrumenting only a subset of application methods for capturing response time metrics, wherein the subset of application methods is statistically expected to impact application performance and wherein the subset of application methods includes methods comprising external component calls to third party services;
   during application runtime capturing response time metrics for each invocation of each of the subset of application methods;
   computing response time metrics for application transactions by summing corresponding response time metrics of methods of the subset that are executed during each transaction invocation;
   analyzing response time metrics to identify anomalous method and transaction states;
   correlating co-occurring anomalous transaction and method states to identify a set of hotspot methods for each transaction, wherein hotspot methods comprise expected root causes for anomalies of each transaction;
   refining the identified set of hotspot methods for each transaction using dissociation rules to eliminate non-participating methods that frequently fail but are not correlated to anomalous transaction states; and
   facilitating corrective action in response to determining hotspot methods for each transaction.

16. The computer program product of claim 15, wherein the subset does not include all methods executed during each transaction invocation.

17. The computer program product of claim 15, wherein analyzing includes detecting median shifts in response time metrics.

18. The computer program product of claim 15, wherein method and transaction response time metrics are collected for each of a plurality of observation intervals.

19. The computer program product of claim 15, wherein analyzing response time metrics to identify anomalous method and transaction states comprises generating a state matrix for each transaction and associated methods.

20. The computer program product of claim 15, wherein refining includes further refining the set of hotspot methods to add correlated rarely failing methods.

21. The computer program product of claim 15, wherein refining is based on a ratio and a threshold.

* * * * *

UNITED STATES PATENT AND TRADEMARK OFFICE
CERTIFICATE OF CORRECTION

PATENT NO.       : 10,198,340 B2
APPLICATION NO.  : 14/599351
DATED            : February 5, 2019
INVENTOR(S)      : Nageswara Rao Vesepogu et al.

Page 1 of 1

It is certified that error appears in the above-identified patent and that said Letters Patent is hereby corrected as shown below:

In the Drawings

In sheet 2 of 6, Fig. 2A, in reference block 208, delete text "ExernalCall(s)" and insert --ExternalCall(s)--, thereof.

Signed and Sealed this
Fourth Day of June, 2019

Andrei Iancu
*Director of the United States Patent and Trademark Office*